June 7, 1927.  
J. P. FERRITER ET AL  
1,631,675
ALTERNATING CURRENT TELEGRAPH REPEATER
Filed Sept. 3, 1925
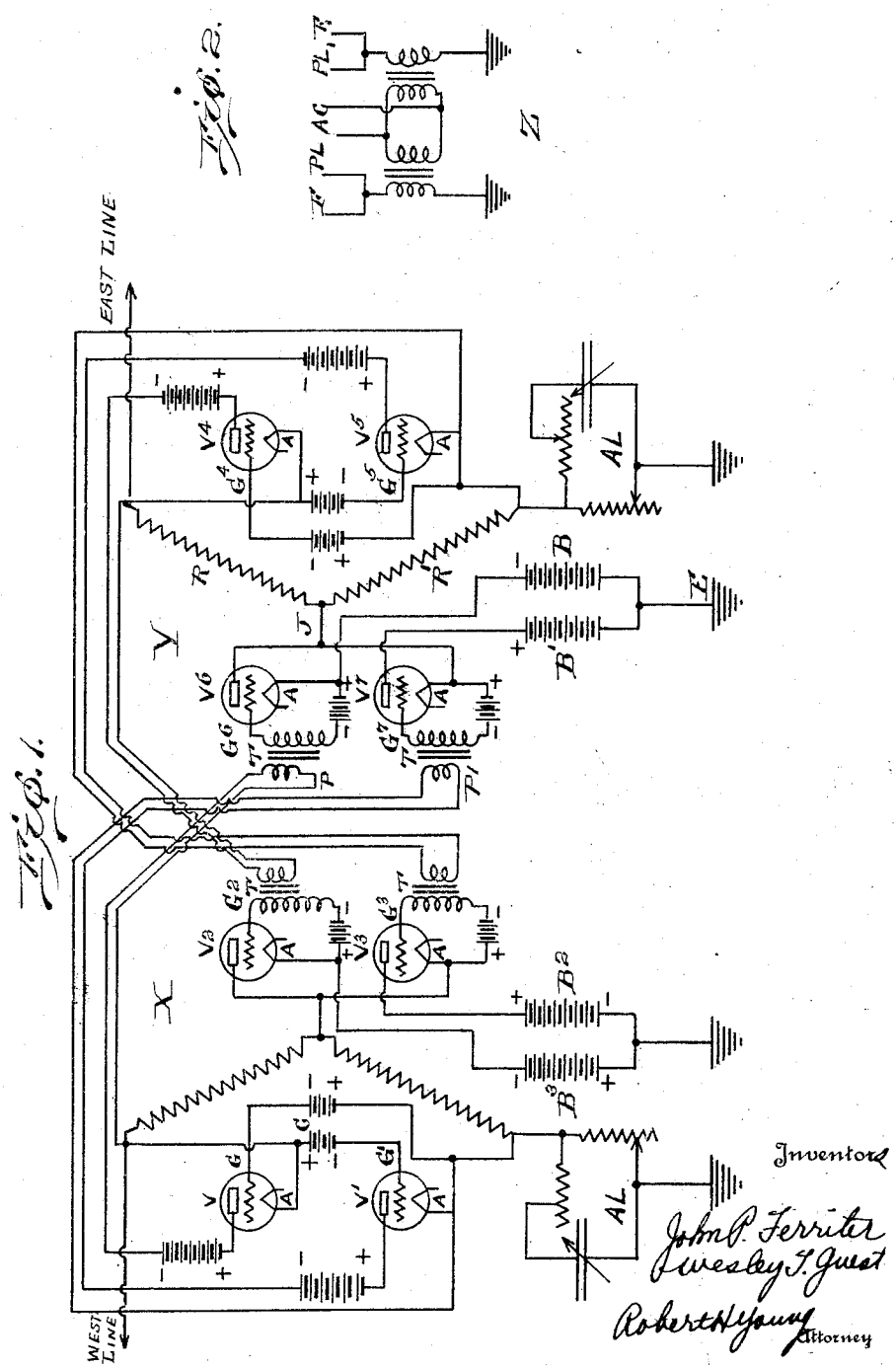

Patented June 7, 1927.

1,631,675

UNITED STATES PATENT OFFICE.

JOHN P. FERRITER, OF OCEANPORT, AND WESLEY T. GUEST, OF EATONTOWN, NEW JERSEY.

ALTERNATING-CURRENT TELEGRAPH REPEATER.

Application filed September 3, 1925. Serial No. 54,289.

The general object of this invention is to provide a means of repeating telegraph signals from a telegraph circuit operated with alternating current to another similarly operated circuit.

A more specific object is to so interconnect two alternating current quadruplex sets, that, when one of the interconnected sets is connected to the terminal of an alternating current telegraph line and the other set is connected to a second alternating current telegraph line, signals may be repeated from one line to the other in both directions simultaneously.

With the foregoing and other objects in view the invention consists in the combination and arrangement of parts set forth hereinafter, certain embodiments being illustrated in the accompanying drawings in which:

Figure 1 represents diagrammatically two alternating current quadruplex sets in connection with our device.

Figure 2 represents diagrammatically in detail a modified arrangement whereby the batteries in the plate circuits of the transmitting tubes may be replaced by an alternating current.

In Figure 1, X and Y represent two alternating current quadruplex sets, each suitably arranged for the transmission and reception of four messages simultaneously, two in one direction and two in the other, so interconnected that signals received from the line on one set are repeated directly to the transmitting circuit of the other set. This system of alternating current telegraphy has been fully described in another patent application.

The signals received from the west line are repeated to the east line in the following manner. A series of negative pulses received from the west line causes a pulsating current to flow in the plate circuit of vacuum tube V. This circuit includes the primary winding P of a step-up transformer T. The plate current passing through P causes grid $G_6$ of transmitting tube $V_6$ to take on an alternating potential with respect to its filament. This causes a pulsating current to flow in the plate circuit of the tube $V_6$. This pulsating current flows from the earth E, through battery B, filament and plate of tube $V_6$, to the junction J of the equal arm resistance bridge R and $R_1$, where it divides half going to the earth through the artificial line AL and half to the east line and to the distant terminal. A series of positive pulses received from the west line causes a pulsating current to flow in the plate circuit of vacuum tube $V_1$. This includes the primary winding $P_1$ of a step-up transformer $T_1$. The plate current passing through $P_1$ causes grid $G_7$ of tube $V_7$ to become alternately positive and negative, causing a pulsating current to flow in the plate circuit of tube $V_7$. This current flows in a positive direction from the earth E, through battery $B_1$, plate and filament of $V_7$, to junction J where it divides as described before, half going to the earth through the artificial line AL and half over the east line to the distant terminal. It will be readily seen how signals from the east line are repeated in the same manner to the transmitting tubes of set X and passed to the west line.

If desired, batteries B, $B_1$, $B_2$ and $B_3$, in the plate circuits of the transmitting tubes, may be replaced by alternating current of any desired audible frequency. The arrangement for this is shown in Fig. 2, where F is connected to the filament of tube $V_2$ and PL to the plate of tube $V_3$; $F_1$ to the filament of tube $V_6$ and $PL_1$ to the plate of tube $V_7$.

We claim—

A vacuum tube alternating current telegraph repeater comprising two alternating current quadruplex sets, each suitably arranged for the transmission and reception of four messages simultaneously, two in one direction and two in the other, means for repeating the signals received from the line of one set directly to the transmitting circuit of the other set, said means comprising in each set a pair of receiving and a pair of transmitting tubes, one of each pair of receiving tubes being adapted to receive negative impulses and the other of each pair to receive positive impulses from its adjacent line, the grids of said transmitting tubes and the plates of said receiving tubes being connected by means of a step-up transformer, the plate current from said receiving tubes causing, by means of said transformers, the grids of said transmitting tubes to take on an alternating potential with relation to their filaments and produce a pulsating current in their plates, a pair of equal-arm resistance bridges adapted to divide the pulsating currents in their adjacent transmitting tubes, half of said current being passed to the corresponding line and to the desired distant station.

In testimony whereof we affix our signatures.

JOHN P. FERRITER.
WESLEY T. GUEST.